(12) United States Patent
Duperrouzel et al.

(10) Patent No.: US 7,149,982 B1
(45) Date of Patent: Dec. 12, 2006

(54) SYSTEM AND METHOD FOR SAVING USER-SPECIFIED VIEWS OF INTERNET WEB PAGE DISPLAYS

(75) Inventors: Brian Gerard Duperrouzel, San Francisco, CA (US); Angus McNab Chassels, IV, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/475,319

(22) Filed: Dec. 30, 1999

(51) Int. Cl.
*G06F 3/00* (2006.01)
(52) U.S. Cl. ...................... 715/788; 715/778; 715/781; 715/784; 715/786; 715/802
(58) Field of Classification Search .............. 345/661, 345/759, 760, 781, 784, 785, 786, 788, 789, 345/793, 798, 799, 800, 973, 801–807; 707/513, 707/517, 520, 500; 715/778, 788, 781, 784, 715/786, 802
See application file for complete search history.

(56) References Cited

U.S. PATENT DOCUMENTS

| | | | |
|---|---|---|---|
| 5,414,809 A | | 5/1995 | Hogan et al. |
| 5,499,334 A | * | 3/1996 | Staab .......................... 345/778 |
| 5,513,342 A | * | 4/1996 | Leong et al. ................ 345/798 |
| 5,694,561 A | * | 12/1997 | Malamud et al. ........... 345/805 |
| 5,712,995 A | | 1/1998 | Cohn |
| 5,734,380 A | | 3/1998 | Adams et al. |
| 5,771,042 A | | 6/1998 | Santos-Gomez |
| 5,900,875 A | * | 5/1999 | Haitani et al. ............... 345/840 |
| 5,920,315 A | | 7/1999 | Santos-Gomez |
| 5,973,692 A | | 10/1999 | Knowlton et al. |
| 6,008,809 A | | 12/1999 | Brooks |
| 6,072,474 A | * | 6/2000 | Morimura et al. .......... 345/173 |
| 6,119,135 A | | 9/2000 | Helfman |
| 6,219,679 B1 | * | 4/2001 | Brisebois et al. ......... 715/501.1 |
| 6,237,030 B1 | * | 5/2001 | Adams et al. .............. 709/218 |
| 6,252,594 B1 | * | 6/2001 | Xia et al. .................... 345/786 |
| 6,275,225 B1 | * | 8/2001 | Rangarajan et al. ........ 345/969 |
| 6,289,361 B1 | * | 9/2001 | Uchida ........................ 345/788 |
| 6,313,854 B1 | * | 11/2001 | Gibson ........................ 345/746 |
| 6,344,865 B1 | * | 2/2002 | Matthews et al. .......... 345/698 |
| 6,832,355 B1 | | 12/2004 | Duperrouzel et al. |

OTHER PUBLICATIONS

U.S. Appl. No. 09/124,468, filed Jul. 28, 1998, Duperrouzel et al.
Andrews, www.internetnews.com/bus-news/article.php/47791, "KatieSoft Scroll Supercharges Top Browsers,", 2 pages, Jul. 20, 1998.

(Continued)

*Primary Examiner*—Weilun Lo
*Assistant Examiner*—Mylinh Tran
(74) *Attorney, Agent, or Firm*—Klarquist Sparkman, LLP

(57) ABSTRACT

A display system having a display screen to display web pages accessible via a network is provided. The display system comprises a computer system structured to send requests for web pages via the network to a web site, and the computer system receives the web pages via the network. A display area displays the web pages received by the computer system. The display system includes display area controls that allow a user to select a characteristic of the web pages to display in the display area. User-specified settings associated with the displayed characteristic of the web pages are stored in a storage area for subsequent recall and automatic execution whenever a subsequent request for the web pages is sent to the network. The display area displays the user-selected characteristic of the web pages in response to these subsequent requests.

23 Claims, 13 Drawing Sheets

OTHER PUBLICATIONS

Press Release, www.jconsult.com/Newsroom/98news/k71698n.htm, "KatieSoft Scroll 3.0 Leverages Power of Netscape Communicator 4.5 and Creates a Dynamic New Internet Interface," 1 page, Jul. 16, 1998.

IBM, "Systems Application Architecture Common User Access Advanced Interface Design Guide," pp. 95-101, Jun. 1998.

"XANA Web Browser Home," http://gamma.nic.fi/~point/xana.htm, dated Jun. 22, 2000, 2 pages.

* cited by examiner

SYSTEM AND METHOD FOR SAVING USER-SPECIFIED VIEWS OF INTERNET WEB PAGE DISPLAYS

CROSS-REFERENCES TO RELATED APPLICATIONS

This application is related to U.S. patent application Ser. No. 09/124,468, entitled "WEB PAGE DISPLAY SYSTEM," filed Jul. 28, 1998.

TECHNICAL FIELD

This invention relates to display systems for displaying electronic data, and more particularly, to network-based web page display systems.

BACKGROUND OF THE INVENTION

Communication technologies continue to provide more capabilities, increase in capacity, and expand throughout the world. An international communication network (commonly referred to as the "Internet") is increasing in both numbers of users and capacity. The Internet is accessible by the general public in a large number of places around the world. Users of the Internet have a universe of network-accessible information.

Along with the Internet, there is growth of other private, government, and commercial networks reserved for authorized users. For instance, some commercial networks are reserved for authorized users such as employees, suppliers, or customers of a company. These other networks may share communication links used by the Internet or they may not.

Regardless of whether the network is the Internet or other networks, users are able to obtain network-accessible information by using web page display systems (sometimes referred to as "network browsers"). These web page display systems download web pages (often written in Hypertext Mark-Up Language or "HTML") containing desired information from the Internet and various private networks. A web page is displayed through the use of the web page display systems on display screens of user terminals, which can include workstation monitors, television sets, and other display devices.

A web page provides many different formats of information including text, graphics, video, sound, and any other format of electronic data. One or more web pages are stored at web sites having web servers that are connected to the network and allow access to the web pages by users of the particular network. The type of information at each particular web site varies from news, cultural, sports, commerce, governmental, corporate, investment, and other various topics. The private networks usually are more limited in the type of information provided compared to the Internet.

Each web page also may contain numerous "hypertext links" which link one web page to many other web pages of related information. As network technology has progressed, everything from web page-based e-mail services, groceries, bookstores, and brokers are competing for the attention of web page users. Web page users have voracious appetites for technology, information, and commerce. Skilled experts have been replaced by skilled masses capable of dealing with more web pages and a vast variety of scenarios and applications.

Because of the amount of information located in a web page and the fact that several web pages may be linked together by a long chain of hypertext links, a user frequently has to use multiple positioning controls, such as scroll bars, to locate a desired portion of the web page to display on the user terminal. Using the scroll bars to locate the desired information each time the user accesses the Internet is time consuming and inconvenient, as the user must repeat the "scrolling" to display the relevant portion of the web page each time the Internet is accessed. This is significantly inconvenient if the web page is large or cluttered with many different types of information.

For example, a web page that displays stock information often displays additional advertising and news related to the stock market. However, only a portion of the web page may have a search window where the user can search for current information for a particular stock by entering its stock ticker symbol. With existing Internet and web page display systems, the user will need to first log on to the Internet, request the particular web page, and then use the scroll bars or other controls to manually focus a display area of the display screen over the portion of the web page that has the search window for stock information.

Thus, it can be appreciated that there is a significant need for a system and method that can enhance web browser applications and reduce the amount of time that a web page user requires to manage and view web pages.

SUMMARY OF THE INVENTION

An embodiment of the present invention resides in a display system, including a display screen, to display web pages accessible via a network. The display system comprises a computer system structured to send a request for a web page via the network to a web site, and the computer is structured to receive the web page via the network from the web site. The display system includes a display processor responsive to display area controls associated with a display area on the display screen to display the web page received by the computer system, with the display area controls being responsive to a user to select characteristics of the web page to display in the display area.

The display system further includes a storage area to store control information associated with the user-selected characteristic of the web page displayed in the display area. If the computer system sends a subsequent request to the web site for the web page, the display processor uses the stored control information, and the display area displays the web page received in the response to the subsequent request in accordance with the user-selected characteristics of the web page.

In one aspect, the computer system sends the subsequent request to the web site in response to a recall of the stored control information. In another aspect, the computer system recalls the stored control information in response to the subsequent request.

Another embodiment of the invention provides a display system to display a web page. The display system comprises a display screen having a display area, with the display area having associated display area controls and being structured to display a requested web page. The display area controls allow a user to configure the display area to display the requested web page in accordance with user-selected characteristics of the web page displayed. The display system further includes control information associated with the user-configured display area. The display area control information is usable to allow the web page to be automatically displayed in accordance with the user-selected characteristics of the web page on the display area if the user makes a subsequent request for the web page.

An embodiment of the present invention provides a method to display web pages. The method comprises requesting a web page from a web site, receiving the requested web page from the web site, displaying the web page in accordance with a user-selected characteristic of the requested web page in a display area, storing display area configuration information associated with the displayed web page, and sending a subsequent request for the web page from the web site using the stored display area configuration information to automatically display the web page in accordance with the stored characteristic of the web page in the display area.

Figure 1:
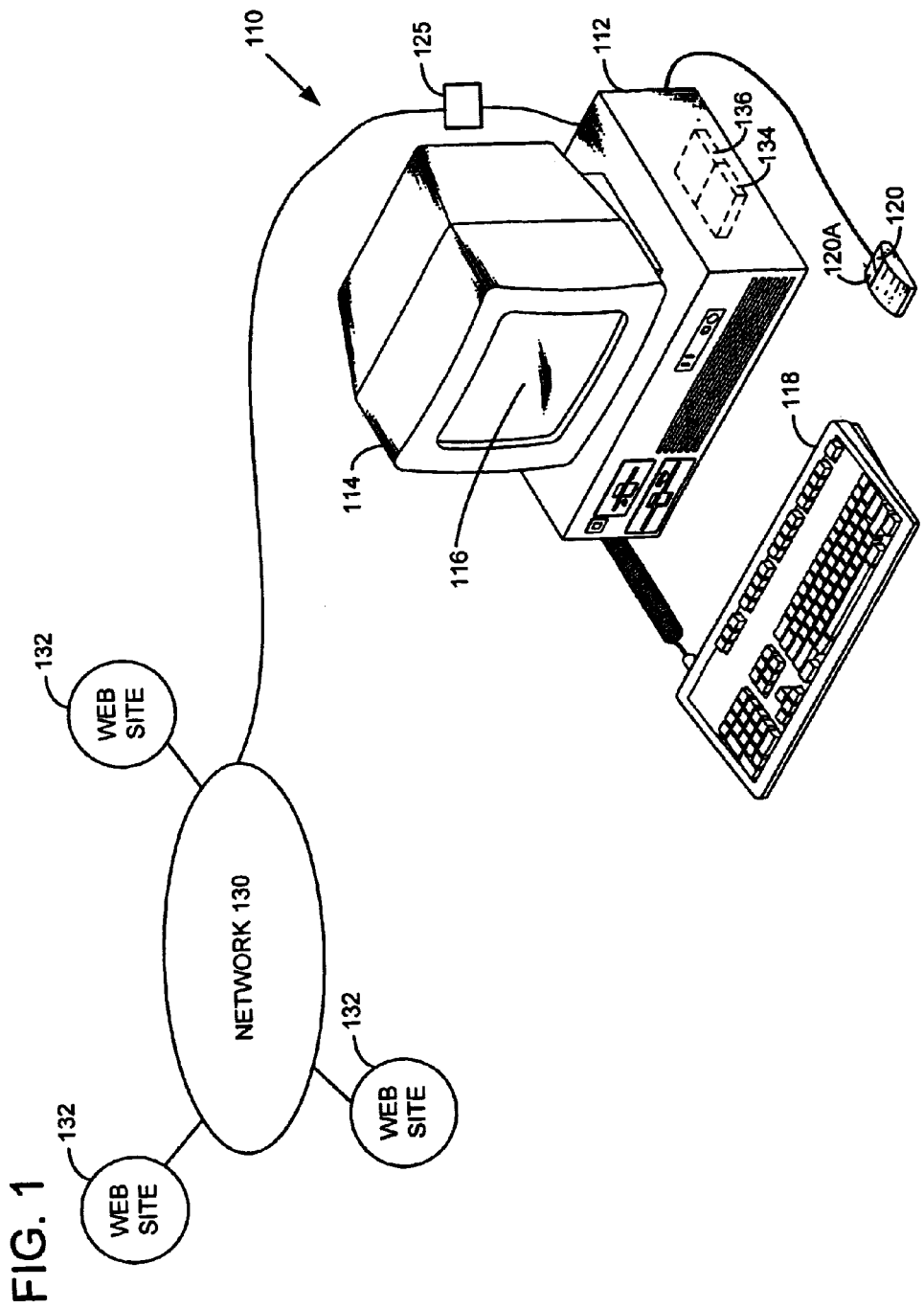
FIG. 1 illustrates a computer workstation user terminal that can implement an embodiment of a web page display system according to the present invention.

In the figures, like reference numerals refer to like parts throughout the various views, unless otherwise indicated. Additionally, the most significant digit in a reference number refers to a figure number in which that element is first introduced (e.g., an element 204 is first introduced in FIG. 2).

DETAILED DESCRIPTION OF THE
ILLUSTRATED EMBODIMENTS

Embodiments of the present invention are directed to a system and method for a web page display system. User-selected characteristics of web pages, such as user-selected portions of one or more web pages received from a network, can be displayed, and then settings and configurations associated with each of these displayed web page portions can be saved and automatically recalled in a subsequent communication with the network. These and other advantages will become apparent in the following detailed description. In the following description, numerous specific details are provided, such as specific screen displays, placement and shapes of controls, and ordering of menu selections. One skilled in the relevant art, however, will recognize that the invention can be practiced without one or more of these specific details, or with other symbols, methods, menus, etc. In other instances, well-known structures or operations are not shown or described in detail to avoid obscuring the description of the embodiments.

A computer workstation user terminal 110 that can implement an embodiment of the web page display system of the present invention is illustrated in the diagram of FIG. 1. The user terminal 110 includes a computer 112, a monitor 114 including a screen 116, a keyboard 118, and a mouse input device 120 with a mouse button 120a. The user terminal 110 accesses a network 130 using conventional networking technology in order to download data, such as web pages, for display. For example, the computer 112 can include a communication controller 125 for accessing the network 130. The communication controller 125 may be a conventional modem using standard analog telephone lines, Integrated Services Digital Network (ISDN) lines, T1 lines, or other such communication links. The computer 112 can also access the network 130 via a network controller (not shown) if the communication controller 125 is a network interface. Other conventional communication controllers may also be readily used to implement embodiments of the present invention. The operation of these various devices to access the network 130 is well known in the art and therefore is not explained in detail herein. The network 130 can be any network that allows access to web sites 132. The network 130 could be, for example, the Internet, a corporate network, a government network, a private network, a commercial network, or other such network.

Once the user terminal 110 downloads a web page from a web site 132, the web page is displayed on the screen 116. The computer 112 includes one or more processors, such as a display processor 134, to process the downloading and displaying of web pages, or to perform other functions associated with operation of the user terminal 110. The computer 112 also includes one or more storage areas 136, which can be any type of computer-readable media, to store information associated with the screen 116 or with displayed web pages. Examples of computer-readable media for the storage area 136 can include read-only memory (ROM), random-access memory (RAM), compact disk read-only memory (CD-ROM), and other data storage devices and their corresponding readers and receptacles. The storage areas 136 need not be physically located within the computer 112. The storage areas 136 can be located remotely from the computer 112, such as on a network (e.g., the network 130), so long as they are accessible by the display processor 134.

Figure 2:
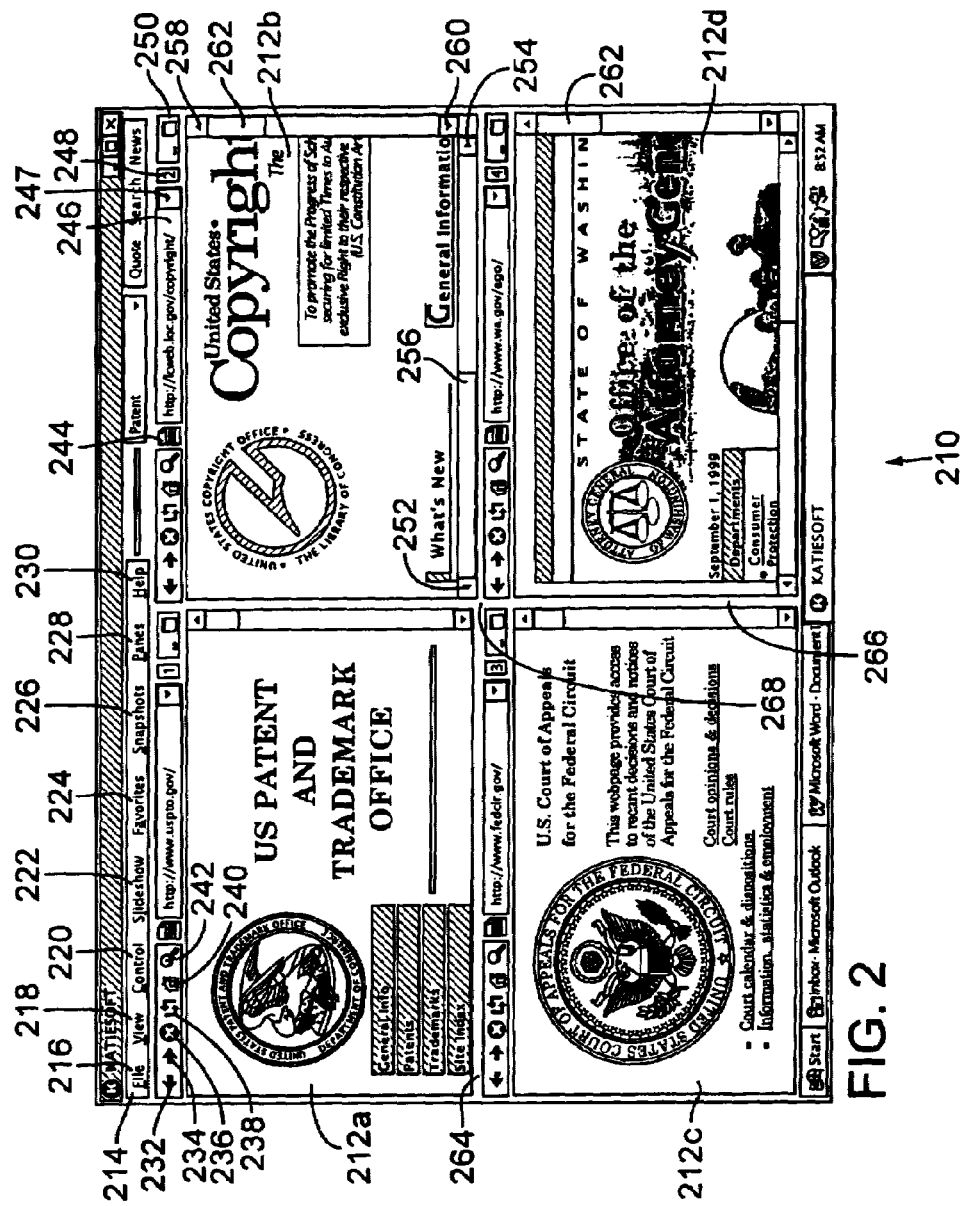
FIG. 2 shows an embodiment of a four-pane screen display of the web page display system of FIG. 1.

FIG. 2 illustrates an embodiment of a screen display 210 (e.g., a "screen shot") wherein four non-overlapping web pages are simultaneously displayed on the screen 116. Embodiments of the present invention will be described hereinafter in the context of displaying four web pages in four corresponding display panes 212a–212d on the screen 116. It is understood that this format is only an example and that any number of web pages, from one web page to more than four, can be displayed when practicing the invention.

Four web pages are displayed in the figures and described herein in order to help clarify and illustrate features and advantages of embodiments of the invention.

Nevertheless, embodiments of the invention provide significant advantages when displaying portions of multiple web pages simultaneously on the screen 116. The simultaneous display of multiple web pages facilitates both navigation of web page-based networks and analysis of web page-based information by a web page user, especially since these users can find themselves somewhat lost after following a long chain of hypertext links between web pages. For instance, when displaying a series of web pages that follow a chain of hypertext links, the user may want to display a portion of a particular web page (such as a "home page") while simultaneously displaying one or more portions of additional web pages from the chain of hypertext links. The display of the home page helps the user keep a general perspective in mind while the user examines in detail the other displayed web pages. Having one or more regions (e.g., display areas of the display panes 212a–212d) of the screen 116 focused on particularly relevant portions of the web pages reduces the amount of unnecessary information that the user sees on the screen 116. For instance, when viewing multiple web pages having information related to the stock market, the user can focus the display pane 212a over a stock search window of one web page, while focusing the other display panes 212b–212d over other portions of that web page or over portions of other web pages.

The four specific web pages displayed in FIG. 2 and other web pages displayed in the other figures are for illustrative purposes. For instance, the four web pages displayed in FIG. 2 include web pages for the U.S. Patent and Trademark Office, the U.S. Copyright Office, the U.S. Court of Appeals for the Federal Circuit, and the State of Washington Attorney General's Office. Embodiments of the present invention are not limited to displaying only these specific web pages. Instead, embodiments of the present invention can display any web page accessible through the network 130. The display panes 212a–212d need not be related web pages or even related subject matter. For example, one display pane can display stock price information while a different display pane may display unrelated subject matter.

The screen display 210 includes a menu bar 214 that provides various menu selections, which in turn have respective pull-down menus associated with configuration or operation of the screen display 210. The menu bar 214 includes, for example, a File menu 216, a View menu 218, a Control menu 220, a Slideshow menu 222, a Favorites menu 224, a Snapshots menu 226, a Panes menu 228, and a Help menu 230. Features and options under these menus 216–230, including those of their respective pull-down menus and sub-menus, will be described in further detail below.

The manner in which the screen 116 of the user terminal 110 simultaneously displays web pages in the display panes 212a–212d is described in detail in the related co-pending application Ser. No. 09/124,468 identified above. Briefly summarizing, the user terminal 110 implements only one instance of most of the executable portions of an associated browser software by associating an individual copy of a web browser control file with each active display pane 212a–212d. This involves using a process known as "parenting" in the case of Microsoft Internet Explorer™ 4.0. In alternative embodiments where a Netscape Navigator web browser engine is used instead of the Microsoft Internet Explorer™ web browser engine, an entire copy of the Netscape Navigator™ web browser engine is executed for each display pane 212a–212d being displayed. In all instances, however, embodiments of the present invention are not limited by the particular web browser engine or particular computer operating system. Instead, embodiments of the invention can be used with all web browser engines and computer operating systems.

Each display pane 212a–212d of the screen display 210 has a display area that displays a portion of a web page. Each display area is in turn framed by various individual controls that provide viewing or transmission/reception options for the particular web page being displayed in a respective display pane 212a–212d, as will be described in further detail below. For the sake of simplicity throughout this description and unless otherwise specified, the individual controls for the display pane 212a will be described, and it is understood that the individual controls for the other display panes 212b–212d also function similarly.

Referring now to various individual controls illustrated in FIG. 2 for the display pane 212a, a back arrow control 232 and a forward arrow control 234 are both related to a sequence in which a series of web pages have been initially displayed on the display pane 212a. The related sequence typically ends with a web page that has been most recently downloaded from the network 130 (see, e.g., FIG. 1) and begins with a web page least recently downloaded from the network 130. Each time the back arrow control 232 is selected (e.g., by clicking on the back arrow control 232 with the mouse button 120a of the mouse 120 of FIG. 1), the display pane 212a will display the next web page that is closer to the beginning of the related sequence than the web page displayed at the time of activation of the mouse button 120a. Similarly, each time the forward arrow control 234 is selected, the display pane 212a will display the next page that is closer to the end of the related sequence than the web page displayed at the time of activation of the mouse button 120a.

A stop control 236 is used to terminate any communication currently in progress with a web site from which the user terminal 110 is downloading a web page. A refresh control 238 repeats a download of the web page currently displayed on the display pane 212a. A home control 240 is used to access a default web page that has been designated as a home page.

A search control 242 of the display pane 212a accesses a web page that has been designated as a search web page. Generally, search web pages contain further controls related to searching for specific web pages containing desired information. Each of the display panes 212a–212d has a web page drag control 244, such as that shown in the display pane 212b. The drag control 244 allows a web page appearing in one of the display panes 212a–212d to be dragged into any one of the other display panes.

A uniform source locator (URL) appears in a window 246 of each display pane 212a–212d. The window 246 indicates the URL of a web page currently appearing in an associated display pane 212a–212d. The URL may be thought of as an "address" of the web site. For example, for the U.S. Copyright Office web page appearing in the display pane 212b, the displayed URL is http://lcweb.loc.gov/copyright/. Although the illustrated embodiment uses URLs, the present invention is not limited to URLs. Any string expression that can represent a web page resource on a network may be used by the present invention. An access control 247 of each display pane 212a–212d, when selected, causes a pop-down list of URLs to appear. The user can then select a URL of a listed web page, and that selected web page will then be displayed in the associated display pane 212a–212d.

A status indicator 248 indicates whether the user terminal 110 is currently in a process of downloading a web page for display one of the display panes 212a–212d. Downloading is indicated by a flashing symbol (not shown) in the status indicator 248, and each of the status indicators 248 of the display panes 212a–212d show numerals 1–4, respectively, when downloading is completed. The numerals 1–4 respectively designate a "pane number" for the display panes 212a–212d.

Minimize and maximize controls 250 allow the screen 116 to display an entire web page (when the maximize control 250 is activated) or allow a particular web page to be removed from the screen 116 (when the minimize control 250 is activated).

The display panes 212a–212d can each include a left scroll button 252 and a right scroll button 254. A horizontal scroll bar 256 is located between the left scroll button 252 and the right scroll button 254. The left scroll button 252, the right scroll button 254, and the horizontal scroll bar 256 appear in one or more of the display panes 212a–212d whenever the lateral width of the web page is wider than the available display area of a particular display pane 212a–212d that displays the web page. These horizontal controls 252–256 allow the user to "scroll" from left to right or from right to left to view different portions of the displayed web page.

Similarly, each display pane 212a–212d can also have an upper scroll button 258, a lower scroll button 260, and a vertical scroll bar 262. The upper scroll button 258, the lower scroll button 260, and the vertical scroll bar 262 appear whenever the height of the web page is greater than the display area of the particular display pane 212a–212d available for displaying the web page. The user can use these vertical controls 258–262 to vertically scroll across the web page. The manner in which the horizontal and vertical positions of these scroll controls can be saved and automatically positioned is described below.

Each of the individual display panes 212a–212d can be re-sized, as described in further detail in the related co-pending application Ser. No. 09/124,468 identified above. Briefly summarizing, the display panes 212a–212d have between them interior horizontal borders 264 and interior vertical borders 266. By using the mouse 120 to "drag" the horizontal borders 264 up or down, the vertical sizes of the affected display panes 212a–212d can be changed. Similarly, by dragging the vertical borders 266 left or right, the horizontal sizes of the affected display panes 212a–212d can be changed. If a central point 268 between the four display panes 212a–212d is dragged, then the sizes of all of the display panes 212a–212d can be simultaneously changed.

The screen display 210 shown in FIG. 2 illustrates a possible default setting where all of the display panes 212a–212d are of equal size and the horizontal scroll bars 256 and the vertical scroll bars 262 are positioned at their extreme left and upper locations, respectively. For the display pane 212b shown in FIG. 2, the dimensions and location of the display pane 212b are, for example, set as follows in HTML script:

<Pane2L=403>
<Pane2T=27>
<Pane2W=395>
<Pane2H=263>.

"<Pane2L=403>" indicates the number of pixels, measured from the extreme left edge of the screen 116, where the left border of the display pane 212b is located. Therefore, in FIG. 2, where the screen 116 has a screen resolution of 800×600 pixels, the left border of the display pane 212b is located 403 pixels to the right of the extreme left edge of the screen 116. That is, the left border of the display pane 212b is approximately centered along the 800-pixel horizontal width of the screen 116.

"<Pane2T=27>" indicates the distance in pixels between the upper border of the display pane 212b and the very top edge of the screen 116. In this case, the top edge of the display pane 212b is located 27 pixels from the very top edge of the screen 116. "<Pane2W=395>" and "<Pane2H=263>" indicate, respectively, the width and height of the display pane 212b in pixels.

The other display panes 212a, 212c, and 212d also have left border, top border, pixel width, and pixel height settings such that all four of the display panes 212a–212d substantially use the entire available pixel area of the screen 116. These pixel settings can change as the size (e.g., the screen resolution) of the screen 116 varies from one computer 112 to another. For instance, screens of some computers have a size of 640×480 pixels. Other common standard sizes are 800×600 pixels, 1024×768 pixels, 1600×1200 pixels, etc. Further, it is possible to have screens 116 that have adjustable screen resolutions. Embodiments of the present invention are suitable for any screen resolution, and so therefore, the invention is not limited by a specific size or resolution of the screen 116.

In FIG. 2, the horizontal scroll bars 256 and the vertical scroll bars 262 are at their leftmost and uppermost locations (e.g., default locations), respectively. As such for the display pane 212b, the respective settings for these scroll bars 256 and 262 in HTML script are as follows:

<ScrollLeft2=0>
<ScrollTop2=0>.

The "0" indicates the pixel coordinate of the displayed web page over which the scroll bars 256 and 262 are focused. The other scroll bars for the other display panes 212a, 212c, and 212d, to the extent that they appear on the screen display 210, are also at their default settings. Therefore, their corresponding scroll bars will also be set at 0.

Figure 3:
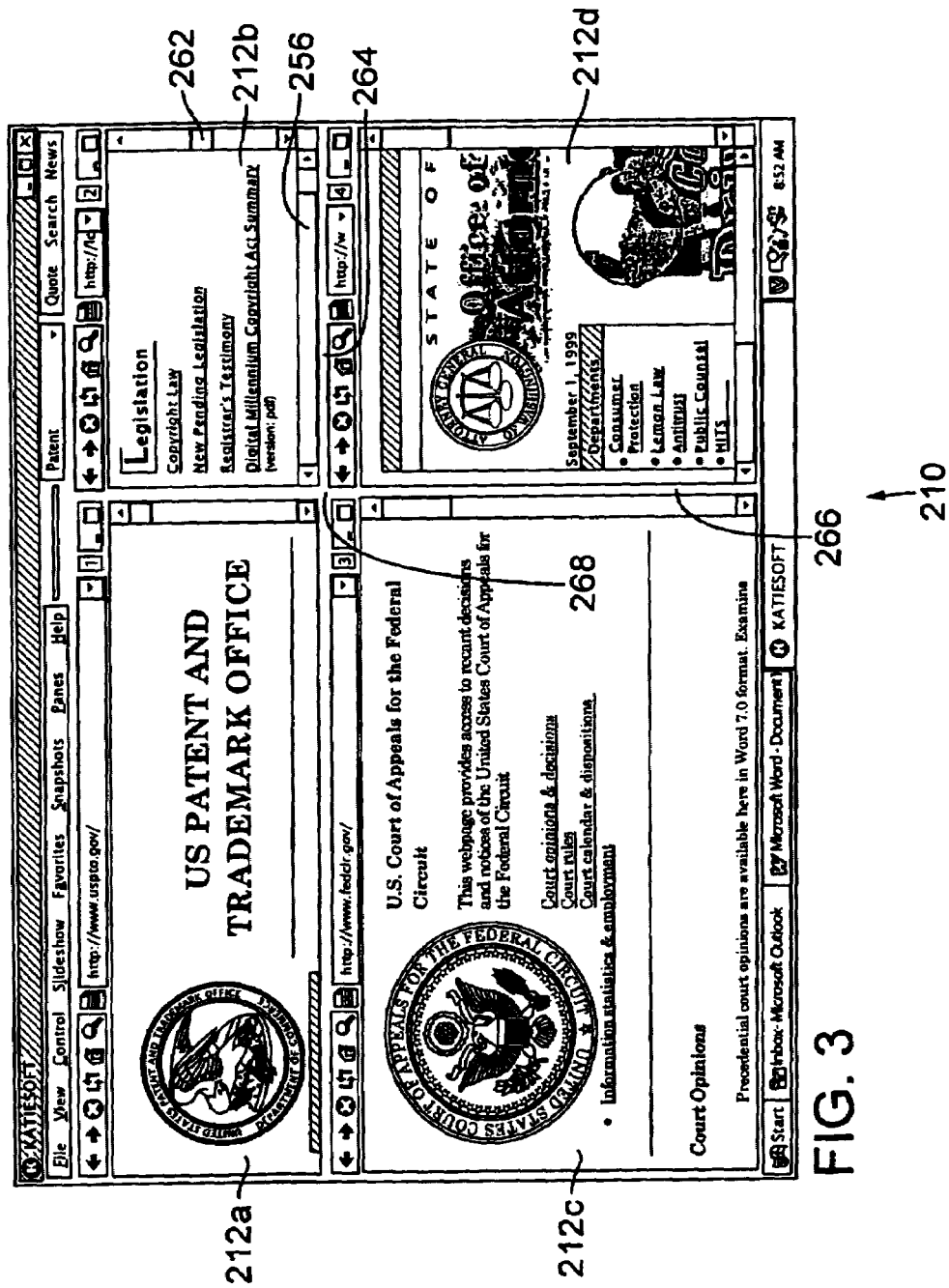
FIG. 3 shows the screen display of FIG. 2 after re-sizing and re-positioning the four panes and after changing scroll bar settings for one of the panes.

FIG. 3 shows another embodiment of the screen display 210 of FIG. 2, where the four display panes 212a–212d have been resized and where the scroll bars 256 and 262 for the display pane 211b have been moved. The display panes 212a–212d are resized by appropriately dragging the horizontal borders 264, the vertical borders 266, or the central location 268 such that the display pane 212b is reduced in size vertically and horizontally, while the other display panes 212a, 212c, and 212d are correspondingly increased in size. Software that operates the screen display 210 change the settings for the display panes 212a–212d as the display pane re-sizing and re-positioning of the scroll bars 256 and 262 occur. The settings for the display pane 212b in FIG. 3 can be re-set as follows in HTML script:

<Pane 2L=471>
<Pane 2T=27>
<Pane 2W=327>
<Pane 2H=203>.

Thus, for a screen resolution of 800×600 pixels, the pixel location of the left border of the display pane 212b has been moved towards the right from the 403$^{rd}$ pixel (see, e.g., FIG. 2) to the 471$^{st}$ pixel. The pixel width of the display pane 212b has been reduced from 395 pixels to 327 pixels, and its pixel height has been reduced from 263 pixels to 203 pixels. The top border setting remains unchanged.

The settings for the scroll bars 256 and 262 of the display pane 212b in FIG. 3 (in HTML script) are re-set as follows:

<ScrollLeft2=421>
<ScrollTop2=351>.

With this new setting, the horizontal scroll bar 256 has been moved horizontally 421 pixels to the right of the "0" horizontal pixel coordinate, and the vertical scroll bar 262 has been moved vertically 351 pixels down from the "0" vertical pixel coordinate. This places the viewing window (or display area) of the display pane 212b at an approximately lower right region of the Copyright Office's web page. By re-positioning the vertical scroll bar 262 and the horizontal scroll bar 256, as well as re-sizing the display pane 212b, the display area of the display pane 212b in FIG. 3 is focused on a user-selected portion of the Copyright Office's web page. Specifically in FIG. 3, the display pane 212b has been focused to a portion of the Copyright Office's web page that identifies hypertext links to relevant copyright legislation.

As will be described in further detail below, the positions of the vertical scroll bar 262 and the horizontal scroll bar 256 can be saved, and then quickly and automatically recalled during future Internet sessions (e.g., subsequent communications with the network 130). This avoids the need to manipulate the scroll bars 256 or 262 to locate the desired portion of the web page each time the user connects to a particular web site 132 and requests web pages.

Figure 4:
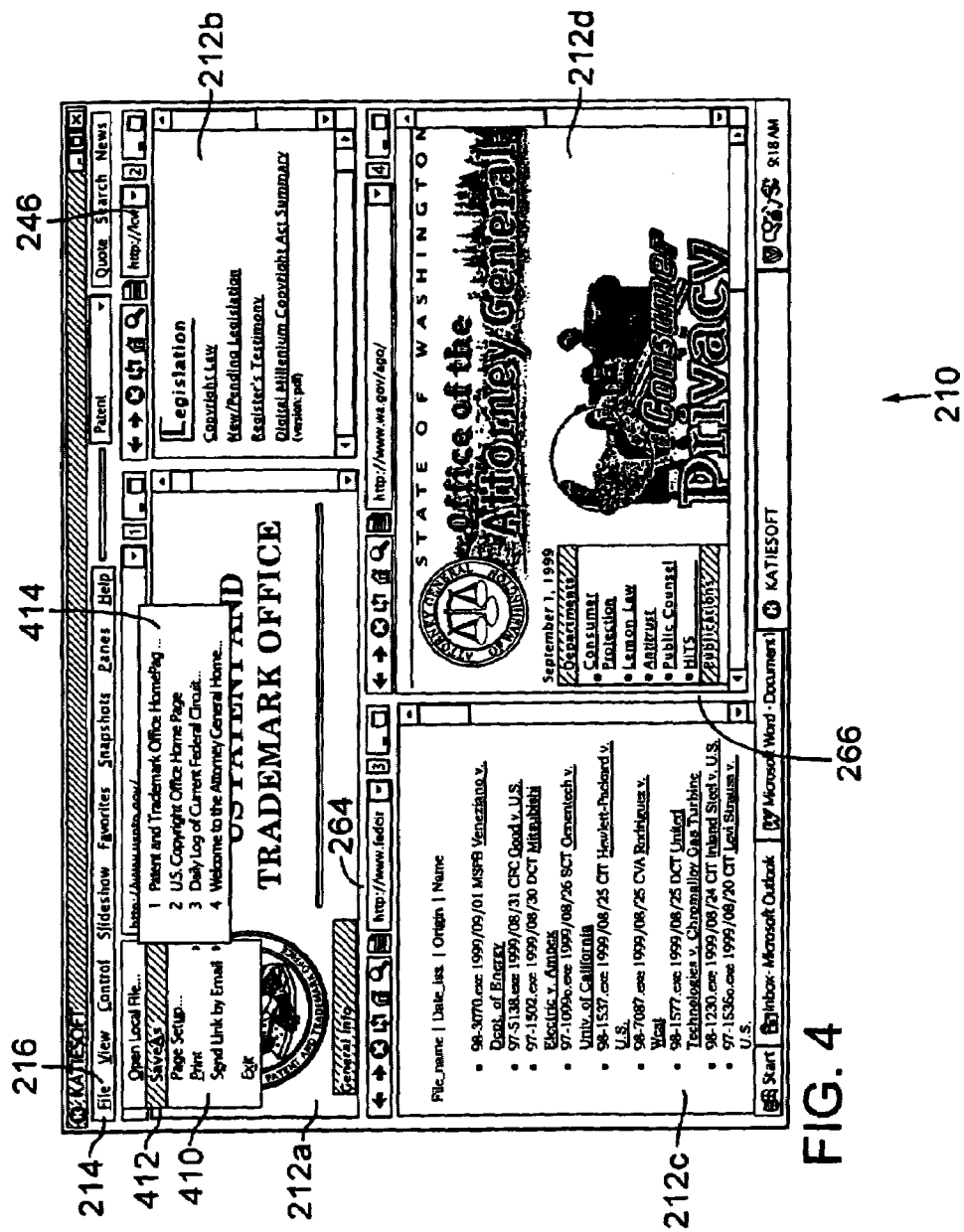
FIG. 4 shows the screen display of FIGS. 2–3 after additional re-sizing and re-positioning of the four panes and after changing scroll bar settings for another one of the panes, and further shows a File pull-down menu.

Referring next to FIG. 4, the various display panes 212a–212d have been re-sized and re-positioned as shown. The display pane 212b still displays the legislation portion of the Copyright Office's web page. In the display pane 212c, the corresponding vertical scroll bar has been moved such that for the Federal Circuit's web page, the display area of the display pane 212c shows the portion of the web page that lists recently issued court decisions. Again, embodiments of the invention are not limited by the specific web page or web page portion displayed in any of the display panes 212a–212d. The display panes 212a–212d can display any web page or web page portion, including web pages accessed via hypertext links between web pages.

In FIG. 4, the vertical border 266 between the display panes 212c and 212d has been adjusted to narrow the display area of the display pane 212c towards the list of court decisions. Similarly, the horizontal border 264 between the display panes 212a and 212c has been moved to further narrow the display area of the display pane 212c towards the list of court decisions. The settings for the display pane 212c in FIG. 4 can be set, in HTML script, for example, to:

<Pane3L=2>
    <Pane3T=227>
    <Pane3W=314>
    <Pane3H=326>
    <ScrollLeft3=0>
    <ScrollTop3=324>

It is noted that for the display pane 212c in FIG. 4, a horizontal scroll bar does not appear, and hence, "<ScrollLeft3>" is set at "0."

A pull-down menu 410 for the File menu 216 is shown in FIG. 4. The pull-down menu 410 provides various options for the web pages displayed in the screen 116. For example, a "Save As" menu option 412 allows the URL address of any one of the web pages shown in the display panes 212a–212d to be selected, via the sub-menu 414, and saved into a designated storage area 136 of the computer 12 (see, e.g., FIG. 1). For example, the Copyright Office's web page shown in the display pane 212b and whose URL address is shown in the window 246, can be saved to any directory or folder designated by the user.

Figure 5:
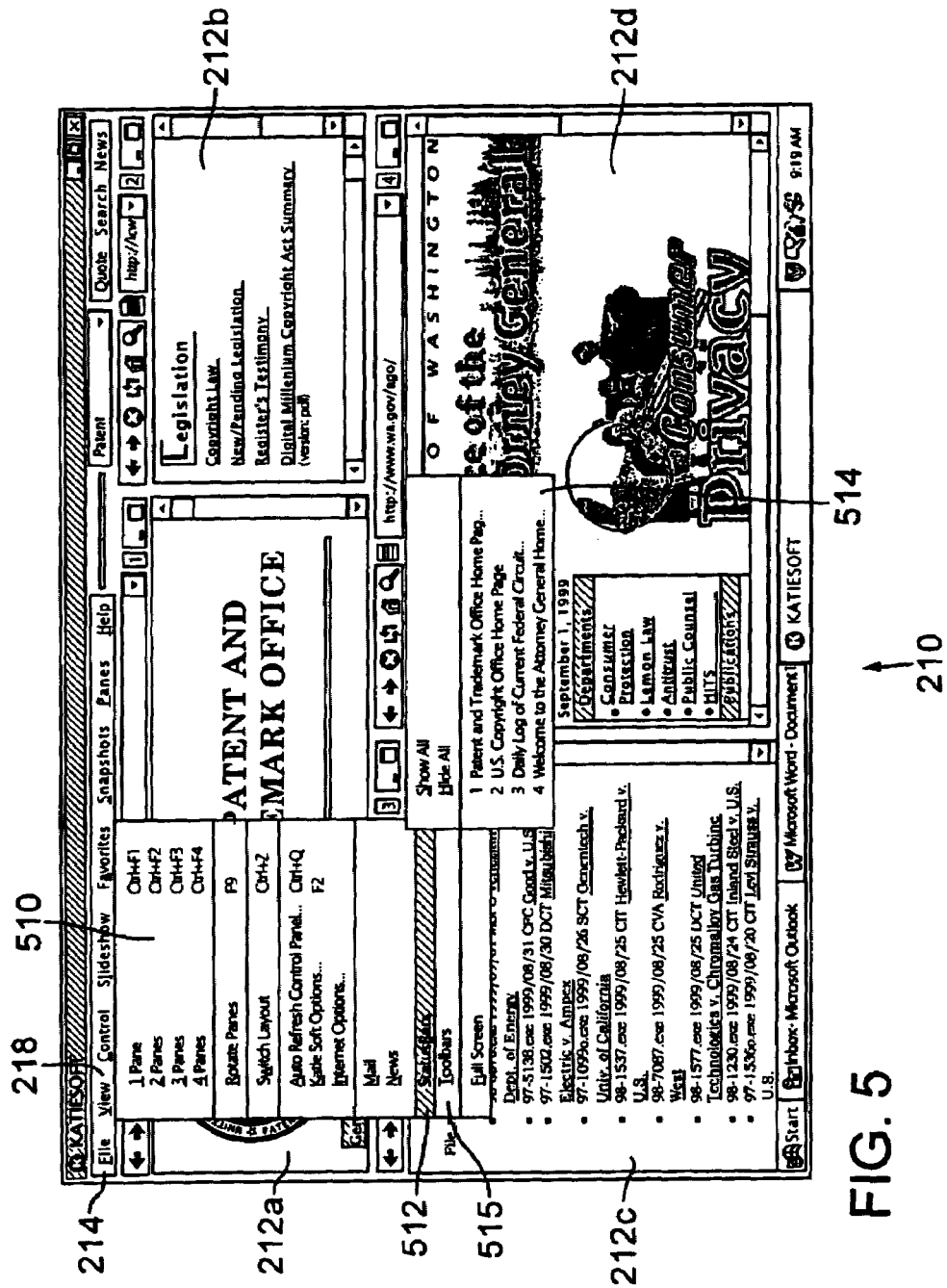
FIG. 5 shows the screen display of FIGS. 2–4 and further shows a View pull-down menu.

FIG. 5 shows a view similar to FIG. 4, but illustrates a pull-down menu 510 for the View menu 218 in the menu bar 214. The pull-down menu 510 includes options to view one, two, three, or four display panes. The current viewing selection as shown in FIG. 5 is set at four panes. If the viewing selection is set at two panes, then only the display panes 212a and 212b will appear on the screen 116, for example. The HTML script for such a setting is:

<view=2>.

The pull-down menu 510 also includes an option to "Rotate Panes" or to "Refresh Control Panel." The Rotate Panes option allows the web pages displayed in the display panes 212a–212d to shift display pane positions.

Other options include, for example, a "Status Bars" selection 512 that provides the user with "Hide All" or "Show All" features for the status bars in the display panes 212a–212d. A status bar (not shown) is a region along the bottom border of each display pane 212a–212d that indicates a URL of a selected hypertext link or indicates whether a connection is being made to that URL. In FIG. 5, all of the status bars for the display panes are hidden, and therefore, the settings for the display panes 212a–212d in HTML script are as follows:

<Statusbar1=off>
    <Statusbar2=off>
    <Statusbar3=off>
    <Statusbar4=off>.

If any of the status bars for display panes 212a–212d are displayed, then the HTML, settings are changed from "off" to "on." Further, a set of sub-menu selections 514 allows the user to designate individual display panes 212a–212d to show or hide an associated status bar, and the HTML setting for that display pane's status bar is then correspondingly set "off" or "on."

The pull-down menu 510 further includes a "Toolbars" option 515. A "toolbar" is shown for each of the display panes 212a–212d in FIG. 5 and includes the back arrow control 232, the forward arrow control 234, the stop control 236, the refresh control 238, the home control 240, the search control 242, the drag control 244, the window 246, the access control 247, the status indicator 248, and the minimize and maximize control 250 (see, e.g., FIG. 2). Since the toolbars are visible in FIG. 5 for all of the display panes 212a–212d, the "Show All" feature of the Toolbars option 515 is activated, and the HTML settings for this format are as follows:

<Toolbar1=on>
    <Toolbar2=on>
    <Toolbar3=on>
    <Toolbar4=on>.

As with the "Status Bars" option 512, the "Toolbars" option 515 can be changed such that all of the toolbars are hidden (e.g., the "Hide All" feature is activated), or the toolbars for individual display panes 212a–212d can be selectively turned "on" or "off." For example, if the toolbar for the display pane 212b is turned "off," then the toolbar of the display pane 212b disappears and the Copyright Office's web page would occupy the entire display area of the display pane 212b. The HTML settings for such a format would be as follows:

<Toolbar1=on>
    <Toolbar2=off>
    <Toolbar3=on>
    <Toolbar4=on>.

As previously described above with respect to saving the locations of the vertical scroll bars 262 and horizontal scroll bars 256, the "on" and "off" HTML settings for the toolbars and status bars can be saved for automatic recall or execution during future communications with the network 130.

Figure 6:
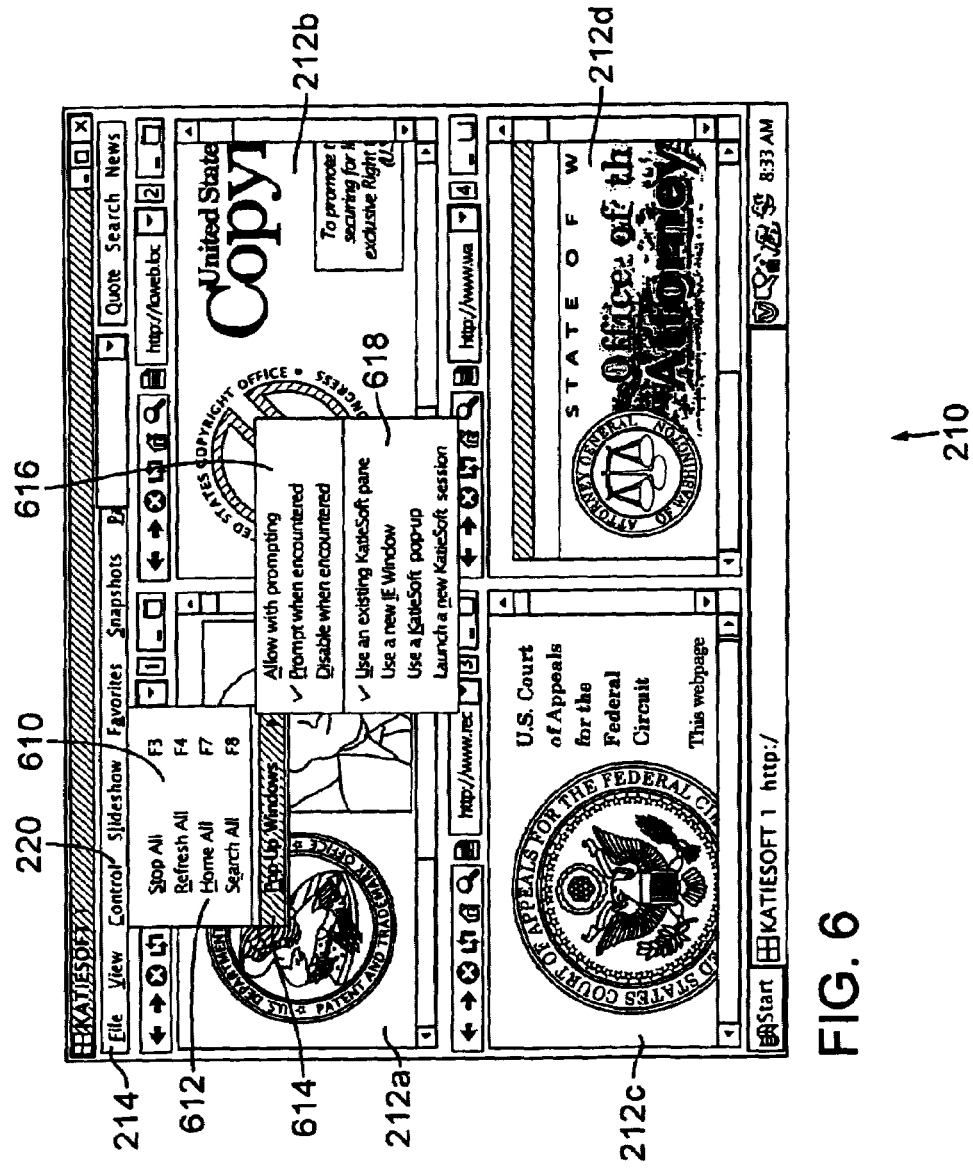
FIG. 6 shows the screen display of FIGS. 2–5 and further shows a Control pull-down menu.

FIG. 6 shows the Control menu 220 in the menu bar 214. The Control menu 220 includes a pull-down menu 610. The pull-down menu 610 comprises a first set of options 612 including a "Stop All," "Refresh All," "Home All," or "Search All," options for the web pages in all of the display panes 212a–212d.

A "Pop-Up Windows" option 614 gives the user the option of receiving a prompt (e.g., a pop-up window) when a web page attempts to automatically open additional pop-up windows. Because web pages can display any type of pop-up window, the "Allow without prompting," "Prompt when encountered," and "Disable when encountered" features give the user several options to control the presentation of these pop-up windows in the display panes 212a–212d. FIG. 6 further shows additional features 618 that the user can select to control where a pop-up window from a web page is displayed. The pop-up window can be displayed, for example, in an existing display pane 212a–212d different from a display pane that is currently displaying the web page, in a web browser window, in another pop-up window, or in a new (e.g., different) set of display panes 212a–212d.

Figure 7:
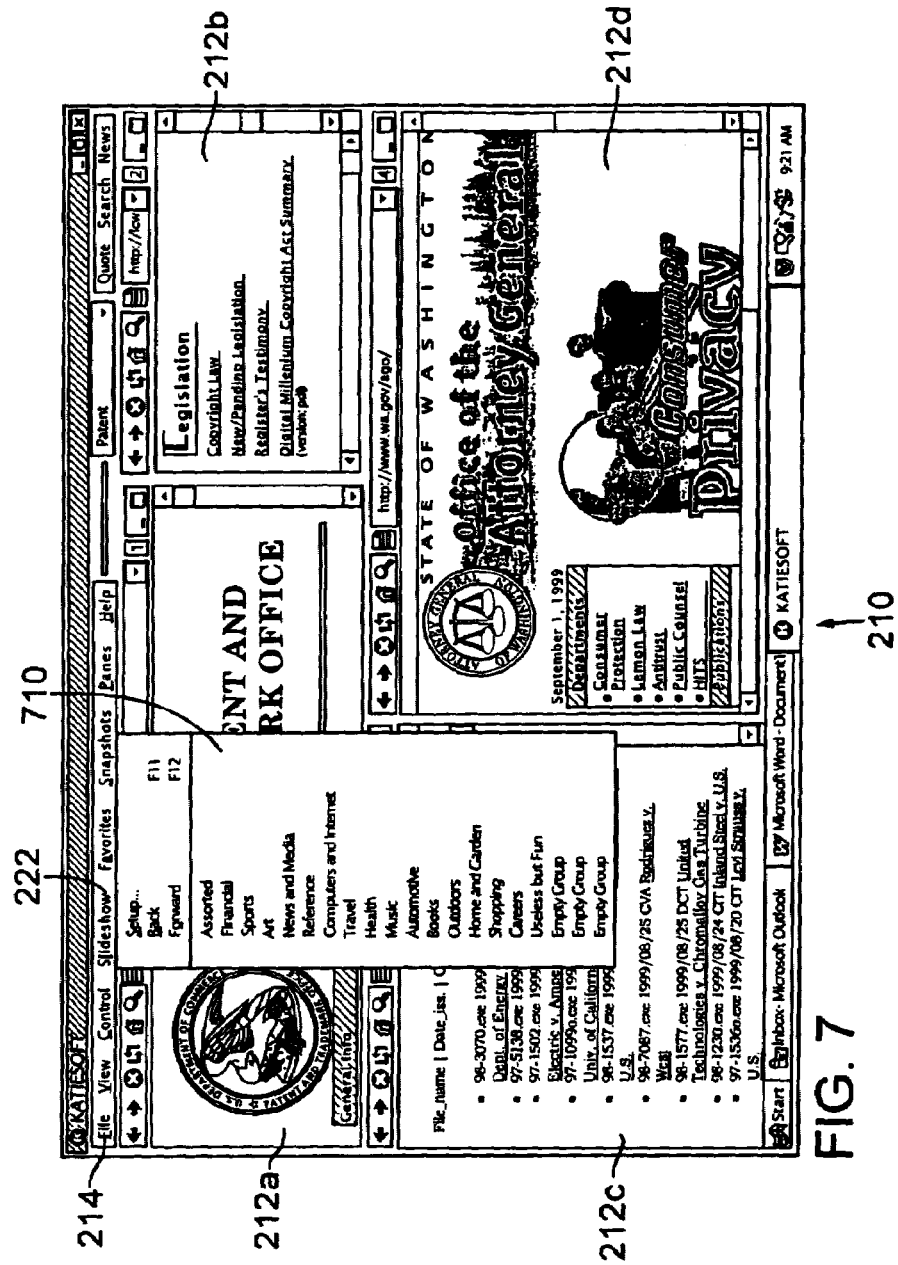
FIG. 7 shows the screen display of FIGS. 2–6 and further shows a Slideshow pull-down menu having assorted topical web pages.
Figure 8:
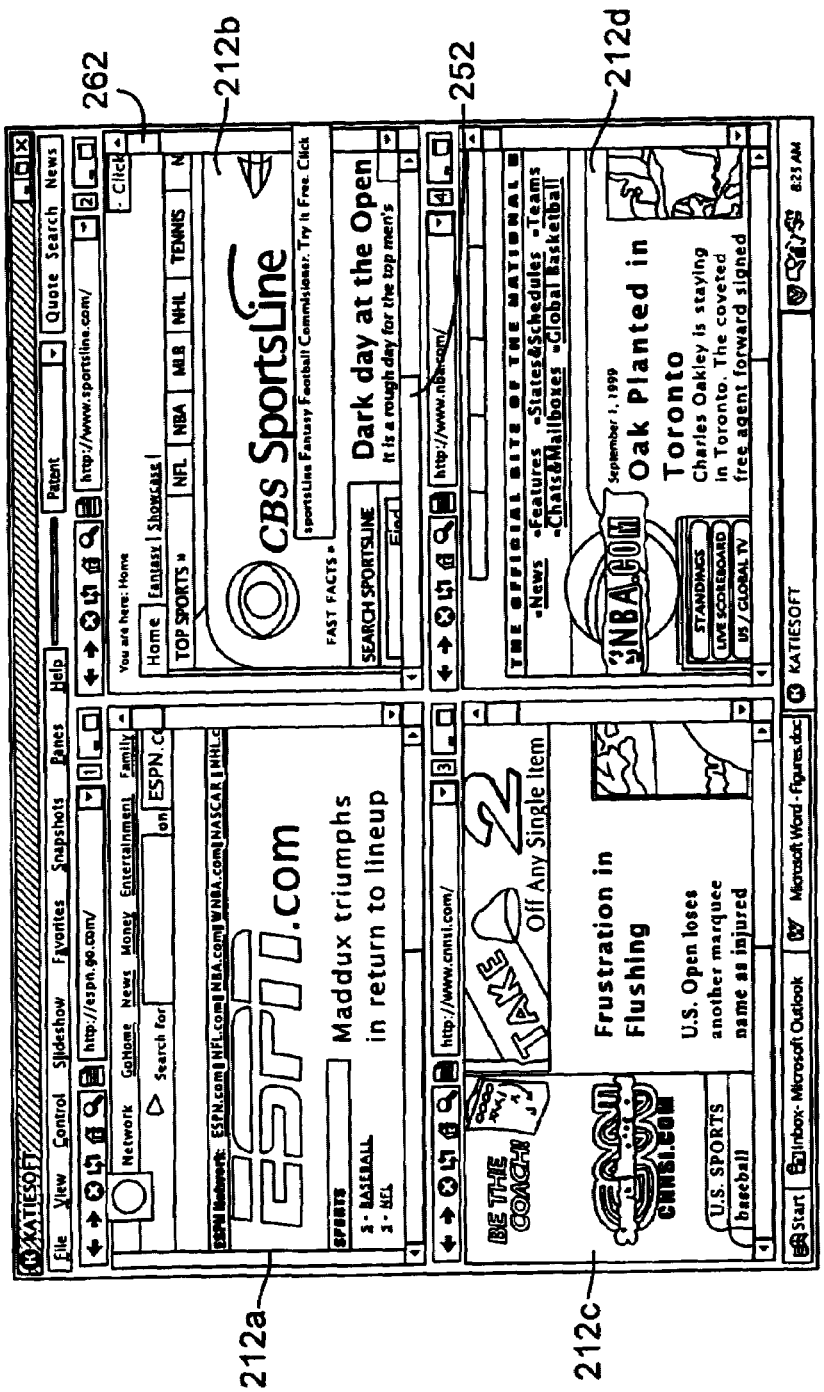
FIG. 8 shows a screen display like that of FIGS. 2–7 showing examples of topical web pages selected from the pull-down menu of FIG. 7.

FIG. 7 illustrates a pull-down menu 710 for the Slideshow menu 222 in the menu bar 214. The pull-down menu 710 includes a list of topical web pages that the user can select and display in the display panes 212a–212d. For example, if the "Sports" option in the pull-down menu 710 is selected, then the display panes 212a–212d would display the various sports web pages, as shown in FIG. 8. As with any of the web pages previously described and shown above, the display-panes 212a–212d shown in FIG. 8 can be re-sized to narrow or expand their respective display areas to display a specific portion of the web pages. Further, the horizontal and vertical scroll bars 252 and 262, respectively, can be positioned at any desired location to focus the display area to a specific portion of a web page. As before, the specific user-selected settings can be saved for automatic recall and execution during subsequent connections to the network 130.

Figure 9:
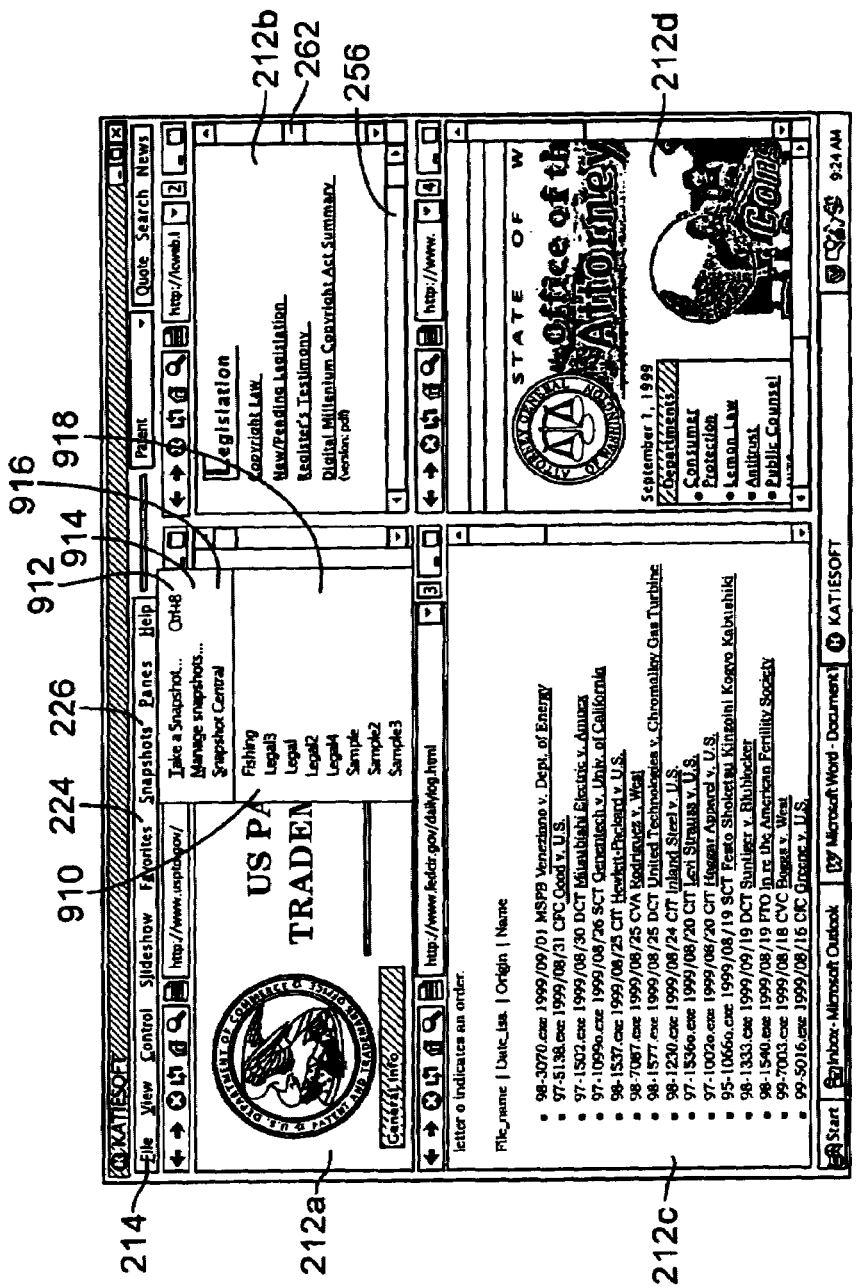
FIG. 9 shows the screen display of FIGS. 2–7 and further shows a Snapshots pull-down that allows user-selected portions of web pages to be saved and retrieved.

Referring next to FIG. 9, the Favorites menu 224 on the menu bar 214 includes a pull-down menu (not shown) that has a list of frequently viewed web pages and their URLs. The user simply selects a web page from this list and then clicks on a selected one of the display panes 212a–212d where the user wishes to display the selected web page.

The Snapshots menu 226 and its pull-down menu 910 provide the user with the capability of saving specific web pages (e.g., their URL, addresses) and the configuration settings (such as the locations of the horizontal scroll bar 256 and the vertical scroll bar 262) for their corresponding display panes 212a–212d. A "Take a Snapshot" menu selection 912 allows the user to save the URL addresses of displayed web pages and configuration settings for the display panes 212a–212d exactly as they appear on the screen 116. This is analogous to the user "taking a picture" of the screen display 210 of the screen 116. The various HTML settings (such as the "<Toolbar2=off>," "<Pane2L=471>," and "<ScrollLeft2=0>" configuration settings illustrated in the preceding paragraphs) of the display panes 212a–212d as they appear are then saved in the storage area 136 for later recall and processing by the display processor 134. The URL addresses of the web pages displayed in FIG. 9 are automatically saved as the following HTML script when the "Take a Snapshot" menu selection is made:

<pane1=http://www.uspto.gov/>
    <page2=http://lcweb.loc.gov/copyright/>
    <page3=http://www.fedcir.gov/>
    <pane4=http://www.wa.gov/ago/>.

If the "Take a Snapshot" menu selection 912 is made, the user can then designate that particular snapshot under any name. The pull-down menu 910 of FIG. 9 shows, for example, a list of titles 918 (such as "Fishing," "Legal," "Sample," etc.) which are the saved titles of snapshots of different web pages and their configuration settings. Whenever the network 130 is subsequently accessed, the user simply selects one of the stored snapshots, and the display processor 134 automatically processes the saved configuration settings for that snapshot. The user need not make any further viewing adjustments—the web pages and display panes 212a–212d are displayed exactly as they were previously saved.

It should be noted that the content of the web pages and display panes 212a–212d are not saved when the "Take a Snapshot" menu selection 912 is selected. Rather, the URL or other indicia of the location of a web site or data storage location and configuration data are saved for future use. At a subsequent time, when the snapshot data is recalled, the user terminal 110 (see FIG. 1) transmits the recalled URLs to the network 130 to request the current web pages associated with those URLs. When the current data is retrieved from the specified web pages (i.e., specified by the URLs) that current data is displayed in the display panes 212a–212d with the size, location and other characteristics of each display panel 212a–212d being displayed in accordance with the stored configuration settings.

Figure 10:
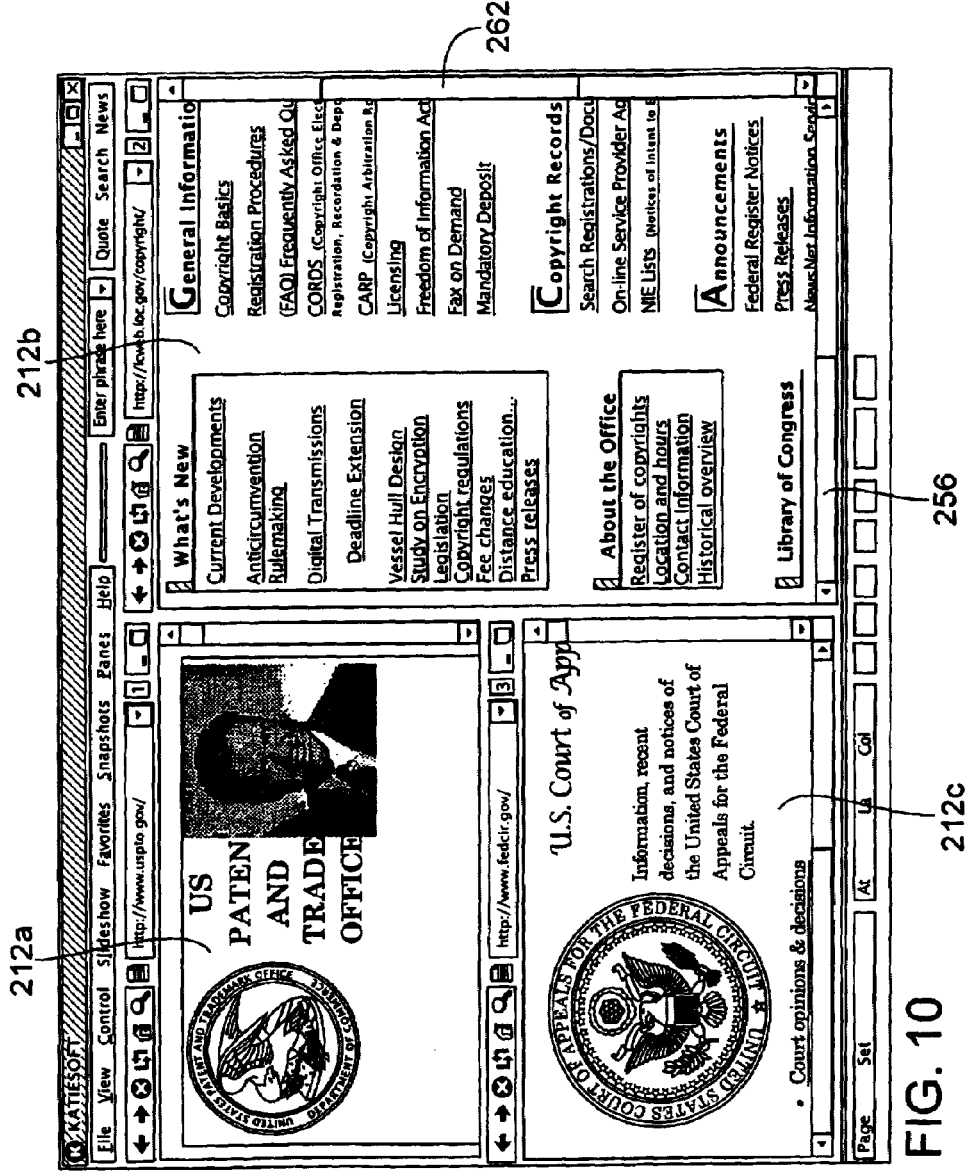
FIG. 10 shows the screen display of FIGS. 2–7 and further shows a configuration in which the user has navigated to a specified location within one or more of the web pages displayed in the panes.

Furthermore, the specific positions within those web pages, as determined by the configuration settings (e.g., the position of the scroll bars 256 and 262), are also recalled such that the user terminal 110 automatically navigates to the precise location within each web page. For example, the pane 212b in FIG. 2 is a web site for the United States Copyright Office. A portion of the web site entitled "What's New" to indicate recent news related to copyright law. The user may manipulate the scroll bars 256 and 262 to prominently position that portion of the web page for the U.S. Copyright Office and take a snapshot of those screen settings, such as illustrated in FIG. 10. All configuration settings associated with the display illustrated in FIG. 10 are saved when a snapshot is taken. This includes, but is not limited to, the specific URLs, the number of displayed panes, the position of the scroll bars 256 and 262 associated with each of the displayed panes and the relative size and position of each of the display panes. In the example illustrated in FIG. 10, the display pane 212b occupies the entire right hand portion of the display screen. The scroll bars 256 and 262 for the display pane 212b have been manipulated such that the "What's New" column for the U.S. Copyright Office is positioned at a location desired by the user. Other display panes (e.g., the display panes 212a and 212c) may also be positioned at specific locations in the web site specified by the user through the manipulation of the various navigational aids (e.g., the scroll bars 256 and 262).

When a particular snapshot is recalled at a subsequent time, the user terminal 110 sends the request for the URLs in a manner described above. The data returned from the web sites specified by the URLs is displayed in accordance with the stored configuration settings. That is, the current data from those web sites will be displayed using the number of display panes, size and location of the display panes, and specific position within each web site. The only difference will be that the retrieved data will be the current data from the specified web sites. The storage and retrieval of URLs and configuration settings greatly reduces the navigational efforts required by the user since the user terminal 10 automatically navigates to the precise location within the web site specified by the stored URLs in configuration setting data.

It should be noted that the actual display content is not limited to text, as illustrated in FIG. 10. The retrieved data may comprise text, audio or video data, multimedia data or application programs. The present invention is not limited by the type of data retrieved via the network 130. Furthermore, the retrieved data may be an application program, such as, by way of example, an e-mail program or a word processing program that may be stored on the network 130 or stored locally on the user terminal 110. For example, two of the display panes 212a–212d may contain data from web sites, while the remaining two display panes may contain application programs. When the snapshot is recalled from the storage area 136 (see FIG. 1), the current data is retrieved from the two web sites while the application programs are retrieved and loaded into the remaining two display panes. Thus, the present invention is not limited by the type of data retrieved or the location from which the data is retrieved.

Figure 11:
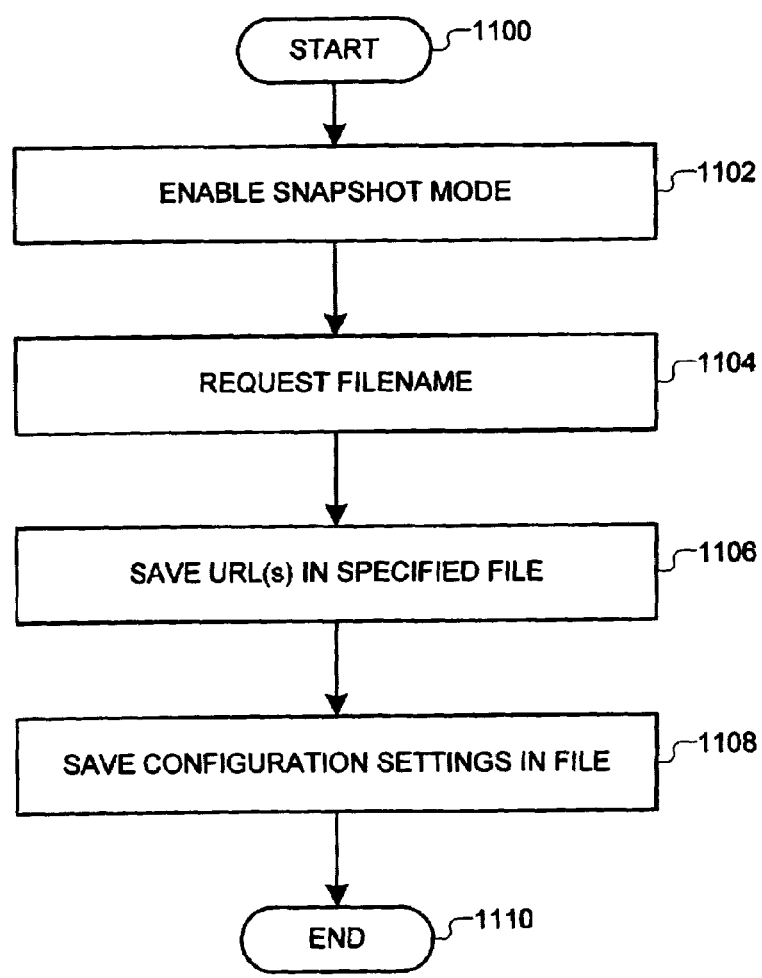
FIG. 11 is a flowchart illustrating the operation of the present invention to store data indicative of one or more web sites and associated configuration settings.

The process for storing a snapshot is illustrated in the flowchart of FIG. 11. At a start 1100 the user has retrieved data from one or more web sites and navigated to a desired location within each of the displayed web sites. As previously noted, the user terminal 10 may display one or more display panes. In step 1102, the user enables the snapshot mode by clicking on the "Take a Snapshot" menu selection 912 (see FIG. 9). Alternatively, the user may enable the snapshot mode by the use of a keyboard combination, such as, by way of example, "Ctrl+B"). When the snapshot mode is enabled in step 1102, the user terminal 110 requests a file name from the user. This may be done in a conventional manner, such as generating a pop-up window (not shown) indicating a file folder in the data storage area 136 in which the snapshot data will be stored. The user enters a file name in a conventional manner using, by way of example, the keyboard 118 to provide the requested file name in step 1104.

In step 1106, the user terminal 110 saves the specified URL(s) or other indicia of the data source in the specified file in the data storage area 136. In step 1108, the user terminal 110 saves the configuration settings in the specified file. As previously noted, the configuration settings may include, but are not limited to, the number of display panes, the position and size of the display panes, the display of toolbars, and the position of scroll bars within each of the panes. As discussed above, the position and size of the display panes may be specified in pixels based on the screen resolution, as is common with HTML. Similarly, the position of the scroll bars may also be specified in pixels relative to the location of each of the display panes. Those skilled in the art will appreciate that other techniques, such as extensibility markup language (XML), may be used to specify the position and size of display panes. Accordingly, the present invention is not limited to the specific technique used to specify the configuration settings. The process ends at 1110 with all relevant data for a display screen being saved in the storage area 136 in association with the user-specified file name.

A "Manage Snapshots" menu selection 914 allows the user to change particular settings of each snapshot, including allowing the user to make textual changes (via an "Edit" option, not shown) to a particular snapshot's HTML script. That is, the user can change the scroll bars' 256 and 262 positions, for example, by typing new pixel locations for these scroll bars in the HTML text, rather than using the mouse 120 to move the scroll bars. Another example of the "Manage Snapshots" menu selection 914 is that if each snapshot is saved in a "c:\" directory of the computer 112, the "Manage Snapshots" menu selection 914 provides the user with options to display the various snapshots as large or small icons, or to organize the icons in the c:\ directory by name, type, size, or date. Other options are possible as well.

The "Manage Snapshots" menu selection 914 is also used to recall a stored snapshot. Returning again to FIG. 9, the list of titles 918 is a list of all stored snapshots. The user can recall any of the snapshots by positioning the cursor over the desired snapshot and clicking the mouse button. Alternatively, the user may recall a saved snapshot using the "Manage Snapshots" menu selection 914, which also lists each of the stored snapshot files. When the user recalls a stored snapshot, the user terminal 110 transmits the URL(s) to the network 130 to retrieve current data from each of the specified URL(s). If the requested data (e.g., an application program) is stored locally on the user terminal 110, it is not necessary to transmit a request to the network 130 for that data item. The display processor configures the display 116 using these recalled configuration settings associated with the stored snapshot. That is, the screen 116 will be configured to contain one or more panes and adjusts the pane size in accordance with the configuration settings so that the retrieved data from the specified web sites (i.e., specified by the transmitted URL(s)) is displayed in the appropriate configuration. In addition, the configuration settings adjust the scroll bars 256 and 262 to automatically navigate to the user-specified location within each of the web sites. Thus, the current data from each of the web sites is displayed in accordance with the pre-stored configuration settings. As previously noted, the recalled data is not limited to text data, but can include multimedia data, such as audio, still images, video, application programs, and the like. The present invention is not limited by the type of data recalled from a specified web site and displayed on the screen 116.

Figure 12:
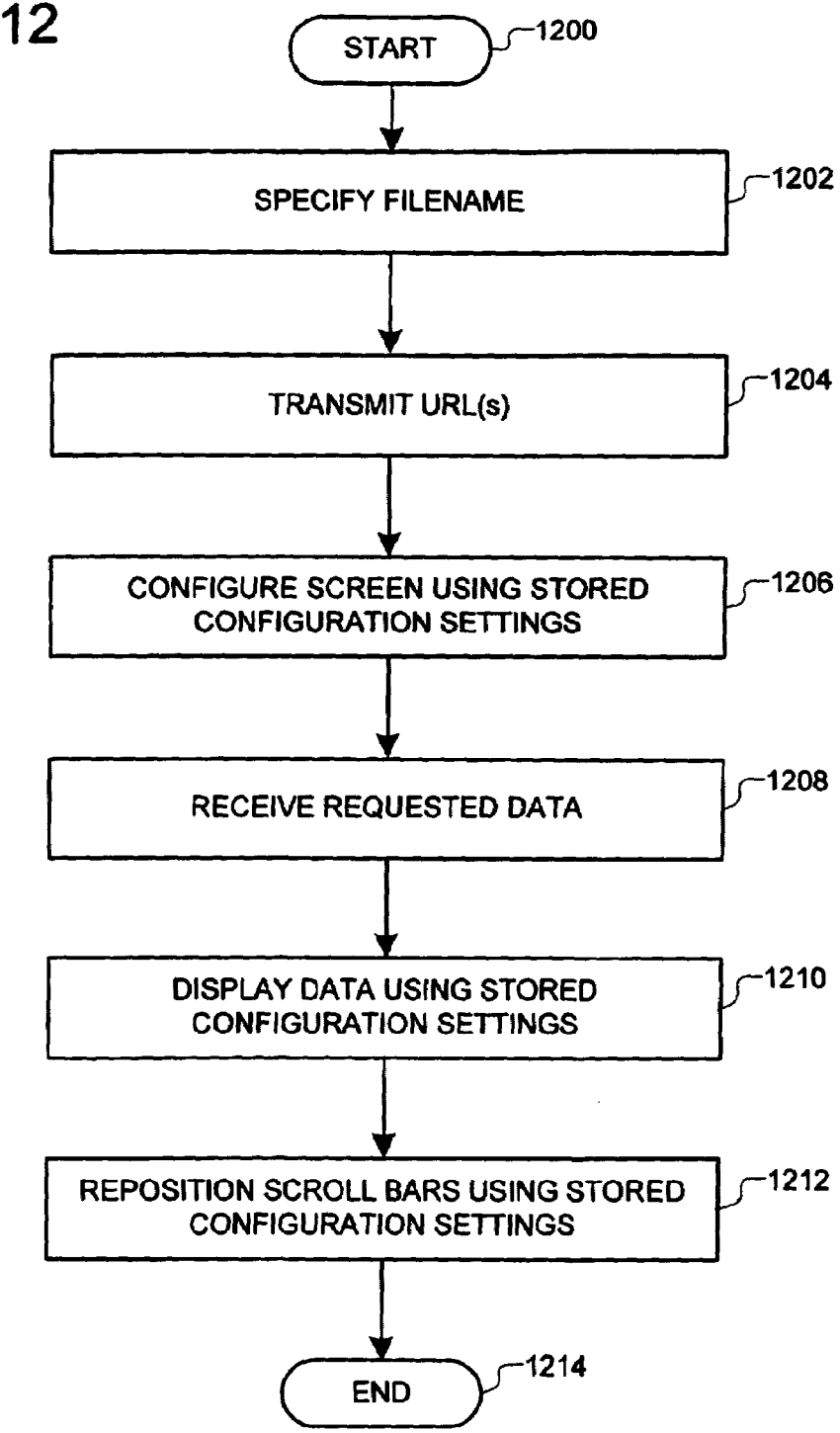
FIG. 12 is a flowchart illustrating the operation of the present invention to recall data indicative of one or more web sites and configuration settings associated therewith.

FIG. 12 is a flowchart illustrating the operation of the user terminal 110 to recall a stored snapshot. At a start 1200, it is assumed that at least one snapshot is stored in the storage area 136 in the user terminal 110 or in a storage location remote from the computer and accessible by the computer. In step 1202, the user specifies the file name of the snapshot to be recalled. The file may be selected using the list of titles 918 (see FIG. 9) as described above or using the "Manage Snapshots" menu selection 914. When a specific file name has been specified in step 202, the communication controller 125 transmits the specified URL(s) to the network 130 in step 1204 (or retrieves data, such as an application program, stored locally on the user terminal 110). In step 1206, the display processor 134 configures the screen 116 in accordance with the recalled configuration settings. As previously noted, the configuration settings may comprise, but are not limited to, the number of display panes, the relative size and position of the display panes and the position of the scroll bars 256 and 262 for each of the display panes. It should be rioted that while the screen 116 may be configured for the appropriate number of display panes and relative size and position of the display panes, the display processor 134 will not reposition the scroll bars for each of the panes until the data has been received from the web sites specified by the URL(s).

In step 1208, the user terminal 110 receives the data from the web sites associated with the specified URL(s). The display processor 134 displays the data associated with each of the web sites in the appropriate display pane in step 1210. In step 1212, the display processor 134 manipulates the scroll bars 256 and 262 for each of the display panes in accordance with the configuration settings to automatically navigate to the correct location in each of the web sites. The process ends at 1214 with the screen 116 containing data from each of the web sites and displayed in accordance with the saved configuration settings. Thus, the user can automatically display the data from one or more web sites and automatically navigate to specific locations within those web sites with the single click of a button. This snapshot feature greatly reduces the time required to navigate to predetermined locations at the specified web sites.

A "Snapshot Central" menu selection 916 provides the user with access to a home page that provides centralized links to topical web sites and web pages (similar to the Favorites menu 224). Other options and features can be provided under the "Snapshot Central" menu selection 916, including allowing the user to post messages in a bulletin board or to download software from the home page.

The user terminal 110 also displays a pop-up window when the data from a web page to be displayed has a different screen resolution than the existing screen resolution that has been set for the screen 116. For example, the screen 116 may be currently set at 640×480 pixels, and the configuration settings for a stored snapshot may be set at a different screen resolution (e.g., at 800×600 pixels).

The screen resolution is significant to the displaying of web pages in the display panes 212a–212d in one or more ways. For example, greater portions of web pages are available for viewing in the display panes 212a–212d if the screen resolution is set at 800×600 pixels rather than at 640×480 pixels.

Therefore, a possible alternative when changing the settings of the screen 116 from the existing screen resolution to the different screen resolution is that the individual display panes 212a–212d can show as much of a portion of a web page that fits in their display areas, and then a pop-up window subsequently provides the user with an option to see more of the web page. Another alternative is to position the individual display areas of the display panes 212a–212d about the centers of the selected portions of the displayed web pages. If a web page is then subsequently recalled in a later communication with the network 130 and viewed under a different screen resolution than as originally saved, then the display area may show more or less than the web page portion than would be viewed if the web page were displayed with the screen resolution as originally saved, but the display area in all cases would still be centered about the original web page portion.

In addition to position data related to positions within a web page, the screen resolution setting can be saved. Embodiments of the present invention are not limited by the particular screen resolution used by the user when saving or opening a particular web page. For example, the HTML settings for a screen size or screen resolution of 800×600 pixels can be as follows:

<ScreenW=800>

<ScreenH=600>.

Saving the screen resolution as one of the configuration settings allows the user terminal to automatically re-scale the data in accordance with the current screen resolution. In yet another alternative, the user terminal 110 can determine the relative size of each of the display panes (e.g., the display panes 212a–212d) on the screen 116 for a particular display resolution (e.g., 800×600 pixels). If the current screen resolution is different (e.g., 640×480 pixels), the display processor 134 in the user terminal 110 can adjust the relative size of each of the display panes (e.g., the display panes 212a–212d) so that each display pane occupies approximately the same relative area on the screen at the current resolution as it did in the screen resolution stored as part of the configuration settings. In this manner, the screen shows the displayed panes in approximately the same relative size and proportion even when the screen resolution has changed. The pop-up window is used to provide a warning to the user that the current screen resolution is different from the screen resolution from the stored configuration settings.

Figure 13:
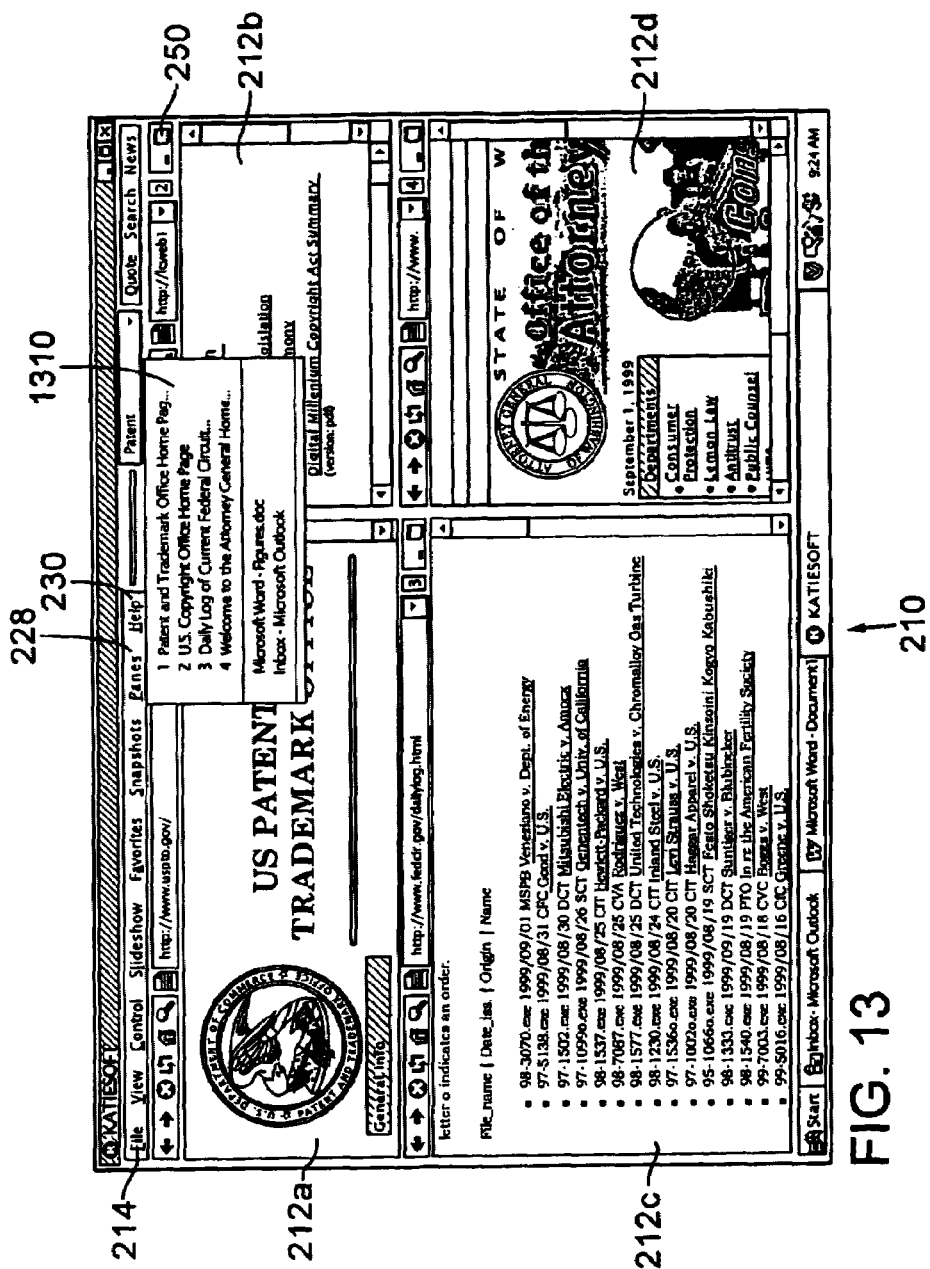
FIG. 13 shows the screen display of FIGS. 2–7 and 9 and further shows a Panes pull-down menu identifying web pages displayed in the panes.

FIG. 13 illustrates a pull-down menu 1310 for the Panes menu 228 on the menu bar 214. The pull-down menu 1310 contains a list of the different web pages displayed in each of the respective display panes 212a–212d. If a particular web page is selected from the pull-down menu 1310, then that web page fills the entire screen 116. This is analogous to activating the maximize control 250 in any one of the display panes 212a–212d. The HELP menu 230 includes a pull-down menu (not shown) that allows the user to obtain information related to operation of and saving configuration settings for the display panes 212a–212b.

The display processor 134 (see, e.g., FIG. 1) operating a software program (such as a Microsoft Internet Explorer™ web browsers) processes configuration settings or configuration control information for the display panes 212a–212d as follows. Within an HTML code itself for the display panes 212a–212d, portions of the code relevant to operation of the web browser are "tagged" as HTML instructions (e.g., the standard <html> tag). The particular user-selected settings for each of the display panes 212a–212d that relate to, for example, the positions of the scroll bars 256 and 262, the pixel location of the borders of the displays panes 212a–212d, the on/off status of the toolbars and status bars, etc., are placed within comment statements in the HTML code and given a different tag. Therefore, when the web browser executes the HTML code (e.g., the HTML-tagged instructions), the user-selected settings for the display panes 212a–212d (having the different tag) are initially ignored as comment statements. After the HTML-tagged instructions are executed, the display processor 134 or web browser is configured to look within the comment statements to execute and implement the various user-selected settings for each of the display panes 212a–212d identified under the different tag. As described above, the user-selected settings within the code, or the entire code itself, can be stored in the storage area 136, or in any other appropriate storage location accessible to the user terminal 110 or to the display processor 134.

Therefore, in summary, embodiments of the invention allow a user to select portions of web pages to display, set configuration settings regarding how these web page portions are displayed, and then save these settings. The settings are then recalled and automatically executed in subsequent Internet sessions.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. The teachings provided herein of the invention can be applied to other communication and display systems, not necessarily the illustrative Internet-based system described above.

The various embodiments described above can be combined to provide further embodiments. All of the above patent applications are incorporated by reference. Aspects of the invention can be modified, if necessary, to employ the systems, methods, and concepts of the various patent applications described above to provide yet further embodiments of the invention.

These and other changes can be made to the invention in light of the above detailed description. In general, in the following claims, the terms used should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer-implemented method of displaying a plurality of web pages, the method comprising:
    while displaying a plurality of user-selected web pages, the web pages being displayed according to user-selected display configuration settings and the display configuration settings including at least in part indications of portions of the web pages to be displayed, receiving a single user-initiated snapshot indication from a user to store a snapshot of the plurality of web pages;
    after receiving the single user-initiated snapshot indication, storing the snapshot of the plurality of web pages, wherein the snapshot comprises network addresses of the plurality of web pages along with stored display configuration settings for the network addresses, the stored display configuration settings representing settings at the time the snapshot indication was received and at least in part including scroll positions for the plurality of web pages, the scroll positions giving indications of portions of the plurality of web pages which were displayed when the indication was received;
    retrieving the snapshot, wherein the snapshot comprises the stored network addresses of web pages and the stored display configuration settings for the plurality of stored network addresses of the web pages;
    requesting the web pages indicated by the stored network addresses;
    receiving data for the web pages indicated by the stored network addresses; and
    simultaneously displaying the web pages indicated by the stored network addresses according to the stored display configuration settings, wherein the displaying navigates to the portions of the web pages which were displayed at the time the snapshot indication was received, the portions corresponding to the scroll positions indicated by the stored configuration settings.

2. The method of claim 1, wherein the displaying comprises displaying the web pages in a plurality of panes, wherein the panes are contained in a single window.

3. The method of claim 2, wherein:
    the display configuration settings comprise settings indicating toolbars to be displayed in respective of the plurality of the panes; and
    displaying the web pages in the plurality of panes comprises displaying toolbars for the panes as indicated by the display configuration settings.

4. The method of claim 2, wherein:
    the display configuration settings further comprise settings indicating a pane position of one or more of the panes; and
    displaying the web pages in the plurality of panes comprises positioning the panes in positions as indicated by the display configuration settings.

5. The method of claim 2, wherein
    the display configuration settings comprise an indication of a screen resolution; and
    the displaying re-scales display panes to respective relative areas indicated by the display configuration settings.

6. The method of claim 2, wherein:
    the display configuration settings further comprise settings indicating a size of one or more of the panes; and
    the displaying comprises displaying at least one of the web pages in a pane having the size as indicated by the display configuration settings.

7. The method of claim 6, wherein the settings indicating the size comprise at least one dimension of a pane in pixels.

8. The method of claim 1, wherein the retrieving retrieves the display configuration settings from within HTML comment statements.

9. The method of claim 1, wherein
    the display configuration settings comprise an indication of a position of one or more scroll bars; and
    the displaying navigates to the position of the one or more scroll bars.

10. The method of claim 1, wherein
    the display configuration settings comprise an indication of a screen resolution; and
    the displaying re-scales based on a current screen resolution and the screen resolution of the configuration settings.

11. The method of claim 1, further comprising:
    receiving a user indication of a name for the snapshot;
    wherein the retrieving retrieves the snapshot based on the name.

12. The method of claim 11 wherein the user indication of the name is received by selection from a list.

13. One or more computer-readable media comprising computer-executable instructions for performing a method comprising:
    while displaying a plurality of user-selected web pages, the web pages being displayed according to user-selected display configuration settings and the display configuration settings including at least in part indications of portions of the web pages to be displayed, receiving a single user-initiated snapshot indication from a user to store a snapshot of the plurality of web pages;
    after receiving the single user-initiated snapshot indication, storing the snapshot of the plurality of web pages, wherein the snapshot comprises network addresses of the plurality of web pages along with stored display configuration settings for the network addresses, the stored display configuration settings representing settings at the time the snapshot indication was received and at least in part including scroll positions for the plurality of web pages, the scroll positions giving indications of portions of the plurality of web pages which were displayed when the indication was received;
    retrieving the snapshot, wherein the snapshot comprises the stored network addresses of web pages and the stored display configuration settings for the plurality of stored network addresses of the web pages;
    requesting the web pages indicated by the stored network addresses;
    receiving data for the web pages indicated by the stored network addresses; and
    simultaneously displaying the web pages indicated by the stored network addresses according to the stored display configuration settings, wherein the displaying navigates to the portions of the web pages which were displayed at the time the snapshot was received, the portions corresponding to the scroll positions indicated by the stored configuration settings.

14. A method of configuring display of a plurality of simultaneously displayed web pages, the method comprising:
   simultaneously displaying the plurality of web pages, wherein the web pages are identified by respective network addresses, a user can indicate which portion of at least one of the web pages is to be displayed, the portion being a user-selected portion of the at least one of the web pages, and the web pages are displayed according to user-selected display configuration settings, the display configuration settings including at least in part indications of the user-selected portion to be displayed;
   receiving a single user-initiated snapshot indication from a user to store a snapshot of the plurality of web pages and a user indication of a title for the snapshot;
   after receiving the single user-initiated snapshot indication and indication of a title, storing the snapshot of the plurality of web pages, wherein the snapshot comprises the title, the respective network addresses and the display configuration settings including indications of the user-selected portion of the at least one of the web pages, the stored display configuration settings representing settings at the time the snapshot indication was received;
   receiving a user-initiated indication that the snapshot for the title is to be re-displayed;
   retrieving the snapshot, wherein the snapshot comprises the title, the stored respective network addresses, and the stored display configuration settings;
   requesting the plurality of web pages identified by the respective network addresses;
   receiving data associated with the network addresses, wherein the data represents subsequently requested versions of the plurality of web pages; and
   simultaneously re-displaying the plurality of web pages according to the stored display configuration settings, wherein the re-displaying displays a portion of at least one of the subsequently requested versions of the plurality of web pages corresponding to the user-selected portion of the at least one of the web pages as indicated by the stored display configuration settings.

15. The method of claim 14, wherein re-displaying the plurality of web pages comprises displaying the web pages in respective panes, the panes contained in a single window.

16. The method of claim 15, wherein:
   the display configuration settings include indications of the user-selected portion of the at least one of the web pages by indicating a position of one or more scroll bars for at least one of the panes; and
   the re-displaying displays the at least one of the panes having the position of the one or more scroll bars as indicated by the display configuration settings.

17. The method of claim 15, wherein:
   the display configuration settings comprise an indication of a position of one or more of the panes; and
   the re-displaying displays the one or more of the panes in the position as indicated by the display configuration settings.

18. The method of claim 15, wherein:
   the display configuration settings comprise an indication of a size of one or more panes; and
   the re-displaying displays the one or more of the panes with the size as indicated by the display configuration settings.

19. The method of claim 18, wherein indication of the size indicates at least one dimension of at least one of the panes in pixels.

20. The method of claim 15, wherein:
   the display configuration settings indicate whether a toolbar is to be displayed in at least one of the panes; and
   the re-displaying displays the toolbar as indicated by the display configuration settings.

21. The method of claim 14, further comprising:
   presenting a web browser window comprising a plurality of panes, wherein each of the plurality of panes in the browser is configured to allow a user to modify a display configuration of the panes, wherein the user can browse web pages at different network addresses independently of web pages in other panes.

22. One or more computer-readable media having computer-executable instructions for performing a method of configuring display of a plurality of simultaneously displayed web pages, the method comprising:
   simultaneously displaying the plurality of web pages, wherein the web pages are identified by respective network addresses, a user can indicate which portion of at least one of the web pages is to be displayed, the portion being a user-selected portion of the at least one of the web pages, and the web pages are displayed according to user-selected display configuration settings, the display configuration settings including at least in part indications of the user-selected portion to be displayed;
   receiving a single user-initiated snapshot indication from a user to store a snapshot of the plurality of web pages and a user indication of a title for the snapshot;
   after receiving the single user-initiated snapshot indication and indication of a title, storing the snapshot of the plurality of web pages, wherein the snapshot comprises the title, the respective network addresses and the display configuration settings including indications of the user-selected portion of the at least one of the web pages, the stored display configuration settings representing settings at the time the snapshot indication was received;
   receiving a user-initiated indication that the snapshot for the title is to be re-displayed;
   retrieving the snapshot, wherein the snapshot comprises the title, the stored respective network addresses, and the stored display configuration settings;
   requesting the plurality of web pages identified by the respective network addresses;
   receiving data associated with the network addresses, wherein the data represents subsequently requested versions of the plurality of web pages; and
   simultaneously re-displaying the plurality of web pages according to the stored display configuration settings, wherein the re-displaying displays a portion of at least one of the subsequently requested versions of the plurality of web pages corresponding to the user-selected portion of the at least one of the web pages as indicated by the stored display configuration settings.

23. One or more computer-readable media having computer-executable instructions for performing a method of configuring display of a plurality of simultaneously displayed web pages, the method comprising:
   simultaneously displaying the plurality of web pages in a plurality of panes in a single window, wherein the web pages are identified by respective network addresses, a user can indicate which portion of at least one of the web pages is to be displayed, the portion being a user-selected portion of the at least one of the web pages, and the web pages are displayed according to user-selected display configuration settings, the display configuration settings including at least in part indications of the user-selected portion to be displayed;

receiving a single user-initiated snapshot indication from a user to store a snapshot of the plurality of web pages and a user indication of a title for the snapshot;

after receiving the single user-initiated snapshot indication and indication of a title, storing the snapshot of the plurality of web pages, wherein the snapshot comprises the title, the respective network addresses and the display configuration settings including indications of the user-selected portion of the at least one of the web pages, the stored display configuration settings representing settings at the time the snapshot indication was received and further indicating a number of panes, a position and size of the panes, whether toolbars are to be displayed for the panes, and a position of scroll bars within the panes;

receiving a user-initiated indication that the snapshot for the title is to be re-displayed;

retrieving the snapshot, wherein the snapshot comprises the title, the stored respective network addresses, and the stored display configuration settings;

requesting the plurality of web pages identified by the respective stored network addresses;

receiving data associated with the network addresses, wherein the data represented subsequently requested versions of the plurality of web pages; and simultaneously re-displaying the plurality of web pages identified by the network addresses according to the stored display configuration settings;

wherein the re-displaying displays a portion of at least one of the subsequently requested versions of the plurality of web pages corresponding to the user-selected portion of the at least one of the web pages as indicated by the stored display configuration settings;

wherein the re-displaying further displays the number of panes as indicated by the stored display configuration settings;

wherein the re-displaying further displays the panes having the position and size as indicated by the stored display configuration settings;

wherein the re-displaying further displays toolbars for the panes as indicated by the stored display configuration settings; and wherein the re-displaying displays the panes having the position of scroll bars indicated by the stored display configuration settings.

* * * * *